United States Patent
Michael

(10) Patent No.: US 12,184,783 B2
(45) Date of Patent: Dec. 31, 2024

(54) MULTIPLE FACTOR AUTHENTICATION FOR PORTABLE MEMORY STORAGE SYSTEM

(71) Applicant: iStorage Limited, Middlesex (GB)

(72) Inventor: John Michael, London (GB)

(73) Assignee: iStorage Limited, Middlesex (GB)

( * ) Notice: Subject to any disclaimer, the term of this patent is extended or adjusted under 35 U.S.C. 154(b) by 248 days.

(21) Appl. No.: 17/779,882

(22) PCT Filed: Nov. 5, 2020

(86) PCT No.: PCT/GB2020/052799
§ 371 (c)(1),
(2) Date: May 25, 2022

(87) PCT Pub. No.: WO2021/105647
PCT Pub. Date: Jun. 3, 2021

(65) Prior Publication Data
US 2023/0006828 A1    Jan. 5, 2023

(30) Foreign Application Priority Data

Nov. 25, 2019    (GB) .................................... 1917121

(51) Int. Cl.
*H04L 9/32* (2006.01)
*G06F 21/60* (2013.01)

(52) U.S. Cl.
CPC .......... *H04L 9/3228* (2013.01); *G06F 21/602* (2013.01); *H04L 9/3213* (2013.01)

(58) Field of Classification Search
None
See application file for complete search history.

(56) References Cited

U.S. PATENT DOCUMENTS

| 7,409,550 B2 | 8/2008 | Avramopoulos et al. |
| 8,472,629 B2 | 6/2013 | Hamachi |

(Continued)

FOREIGN PATENT DOCUMENTS

| EP | 2400754 A2 | 12/2011 |
| GB | 2439838 A | 1/2008 |

(Continued)

OTHER PUBLICATIONS android.stackexchange.com, "Is there a way to map/translate a pattern-lock to a numeric PIN?" (2016).

(Continued)

*Primary Examiner* — Piotr Poltorak
*Assistant Examiner* — Felicia Farrow
(74) *Attorney, Agent, or Firm* — NIXON PEABODY LLP

(57) ABSTRACT

A method of configuring a controller 14 for controlling access to a memory 12 is provided. The controller 14 has a display 18 configured to selectively display a plurality of different input screens, wherein each input screen has a unique code associated therewith and the input screens are for receiving user credentials from a user. The method comprises the steps: a) inputting to the controller 14 a plurality of authentication factors required to access at least a first portion of the memory 12; b) generating, by the controller 14, a first encryption key for encrypting data stored on the first portion of the memory 12; c) displaying a first input screen at the display 18; d) entering first user credentials to the first input screen and storing the first user credentials as a first factor of authentication; e) displaying a second input screen at the display 18; f) entering second user credentials to the second input screen and storing the user credentials as a second factor of authentication; g) encrypting the code for the second input screen using the first user credentials; and h) encrypting the first encryption key using (Continued)

at least one of the user credentials. A method of gaining access to the memory 12 is also provided in which the code for each subsequent input screen is decrypted using user credentials provided at the previous input screen. A method of authenticating a user and a device configured according to the method are also disclosed.

16 Claims, 7 Drawing Sheets

(56) References Cited

U.S. PATENT DOCUMENTS

| | | | |
|---|---|---|---|
| 9,720,700 | B1 | 8/2017 | Brown et al. |
| 10,129,020 | B2 | 11/2018 | Le Saint |
| 10,313,110 | B2 | 6/2019 | Le Saint |
| 10,666,428 | B2 | 5/2020 | Le Saint |
| 11,271,730 | B2 | 3/2022 | Taylor et al. |
| 2003/0070078 | A1 | 4/2003 | Nosrati et al. |
| 2003/0133576 | A1 | 7/2003 | Grumiaux et al. |
| 2003/0233573 | A1 | 12/2003 | Phinney |
| 2004/0153642 | A1 | 8/2004 | Plotkin et al. |
| 2005/0210249 | A1 | 9/2005 | Lee et al. |
| 2006/0036860 | A1 | 2/2006 | Avramopoulos et al. |
| 2006/0259579 | A1 | 11/2006 | Beverly et al. |
| 2007/0113078 | A1 | 5/2007 | Witt et al. |
| 2007/0226779 | A1 | 9/2007 | Yokomitsu et al. |
| 2008/0126802 | A1 | 5/2008 | Li et al. |
| 2008/0184341 | A1 | 7/2008 | Sebesta et al. |
| 2008/0263363 | A1 | 10/2008 | Jueneman et al. |
| 2008/0279158 | A1 | 11/2008 | Schmidt et al. |
| 2009/0028341 | A1 | 1/2009 | Hamachi |
| 2010/0299716 | A1 | 11/2010 | Rouskov et al. |
| 2010/0323664 | A1 * | 12/2010 | Sivaram ................ H04M 1/66 726/28 |
| 2011/0022856 | A1 | 1/2011 | Ureche et al. |
| 2011/0113235 | A1 | 5/2011 | Erickson |
| 2012/0121084 | A1 | 5/2012 | Tomlinson et al. |
| 2012/0331287 | A1 | 12/2012 | Bowman et al. |
| 2013/0151844 | A1 | 6/2013 | Messerschmidt |
| 2014/0047513 | A1 | 2/2014 | van 't Noordende |
| 2014/0258707 | A1 | 9/2014 | Denny |
| 2015/0156022 | A1 | 6/2015 | Asnaashari et al. |
| 2015/0200774 | A1 | 7/2015 | Le Saint |
| 2015/0200918 | A1 | 7/2015 | Khokhar et al. |
| 2015/0261972 | A1 | 9/2015 | Lee |
| 2016/0021068 | A1 | 1/2016 | Jueneman et al. |
| 2016/0021109 | A1 | 1/2016 | Jueneman et al. |
| 2017/0222801 | A1 | 8/2017 | Le Saint |
| 2017/0230365 | A1 | 8/2017 | Poete |
| 2018/0131511 | A1 | 5/2018 | Taylor et al. |
| 2018/0205538 | A1 | 7/2018 | Le Saint |
| 2018/0205539 | A1 | 7/2018 | Le Saint |
| 2019/0095604 | A1 | 3/2019 | Michael |
| 2019/0173878 | A1 | 6/2019 | Shim et al. |
| 2019/0260578 | A1 | 8/2019 | Saint |
| 2020/0112430 | A1 | 4/2020 | Taylor et al. |
| 2020/0169395 | A1 * | 5/2020 | Hong ................ H04L 9/14 |
| 2022/0158832 | A1 | 5/2022 | Taylor et al. |

FOREIGN PATENT DOCUMENTS

| | | | |
|---|---|---|---|
| GB | 2566107 A | 3/2019 | |
| WO | WO-2014160853 A1 * | 10/2014 | ............. G06F 21/32 |
| WO | WO-2015137745 A1 * | 9/2015 | ............. G06F 21/31 |
| WO | 2019048829 A1 | 3/2019 | |

OTHER PUBLICATIONS

Naik et al., "Multi-dimensional and multi-level authentication techniques." International Journal of Computer Applications 75.12 (2013).
www.blogspot.com, "Revisiting Android disk encryption" (2014).
International Search Report for Application No. GB1818156.0, dated Apr. 30, 2019.
Great Britain Search Report for Application No. 1714256.3 dated Mar. 5, 2018.
International Search Report for PCT/GB2018/052458 dated Nov. 7, 2018.
Written Opinion for PCT/GB2018/052458 dated Nov. 7, 2018.
International Search Report for PCT/EP2019/080134, mailed Dec. 13, 2019.
Written Opinion for PCT/EP2019/080134, mailed Dec. 13, 2019.
Schneier, "Applied Cryptography", J. Wiley and sons, 2nd edition, 31-33 (1996).
Office-Action in U.S. Appl. No. 16/120,721, dated Dec. 10, 2020.
Search Query Report from IP.com (performed Mar. 19, 2021) (Year: 2021).
Search Query Report from IP.com (performed Jan. 10, 2023) (Year: 2023).

* cited by examiner

MULTIPLE FACTOR AUTHENTICATION FOR PORTABLE MEMORY STORAGE SYSTEM

PRIORITY CLAIM

The present application claims priority to PCT Application No. PCT/GB2020/052799 filed on Nov. 5, 2020, which claims priority to United Kingdom Application No. GB1917121.4, filed Nov. 25, 2019. The entirety of this application is hereby incorporated by reference.

The present disclosure relates to a method of configuring a controller for controlling access to a memory and a method of authenticating a user. A related portable memory storage device is also disclosed.

It is known to store data in portable memory storage devices such as external hard-drives, flash drives, "USB sticks" etc. so that data may be readily moved between computers and shared by different users. Flash drives are usually configured with a monolithic memory area which may be protected by access controls such as passwords, PINs, and/or encryption. Partitions are a well-known way to divide a memory area into separate areas that may be accessed, formatted, and changed independently. To protect the data, some portable memory storage devices incorporate password protection of the data, such that only a user who knows (or an attacker who discovers) the password can access the data. Other portable memory storage devices require multiple factors of authorization before allowing a user access to the memory. Commonly authentication is carried out on the host system to which a portable memory storage device is attached.

There are three generic types of authentication factor that may be used to identify and differentiate legitimate users and differentiate legitimate from illegitimate users. The three different factors are:

1) something the user knows (e.g. a password or PIN);
2) something the user is (e.g. biometric data—fingerprint data, iris data etc.); and
3) something the user has (e.g. a token).

For further security, some portable memory storage devices store the data in an encrypted form so that an attacker cannot simply bypass the security (e.g. by separating a hard drive from a controller that handles the user authentication, and reading the hard drive directly). It is important to keep the encryption key(s) safe from any potential attacker. It is desirable to improve the security for portable memory storage devices, particularly for portable memory storage devices that have multiple different users.

According to a first aspect, the disclosure provides a method of configuring a controller for controlling access to a memory, the controller connected to a display configured to selectively display a plurality of different input screens, wherein each input screen has a unique code associated therewith, the input screens for receiving user credentials from a user; the method comprising the steps:

a) inputting to the controller a plurality of authentication factors required to access at least a first portion of the memory;
b) generating, by the controller, a first encryption key for encrypting data stored on the first portion of the memory;
c) displaying a first input screen at the display;
d) entering first user credentials to the first input screen and storing the first user credentials as a first factor of authentication;
e) displaying a second input screen at the display;
f) entering second user credentials to the second input screen and storing the user credentials as a second factor of authentication;
g) encrypting the code for the second input screen using the first user credentials; and
h) encrypting the first encryption key using at least one of the user credentials.

This method ensures that the encryption key is stored in encrypted form on the controller. Further, the method prevents an attacker from discovering the form of later input screens until acceptable credentials have been input at earlier input screens. As such, an attacker is forced to attack input screens sequentially rather than in parallel before gaining access to the memory. This increases the difficulty for a malicious user to gain access to the memory.

The plurality of authentication factors may comprise more than two authentication factors; and wherein, before the step h) of encrypting the first encryption key, for each further authentication factor the method comprises: displaying a further input screen at the display; entering further user credentials to the further input screen and storing the user credentials in the controller as further factor of authentication; and encrypting the code for the preceding input screen using the further user credentials.

Having a larger number of authentication factors may increase the security of the memory.

The first encryption key may be divided into a plurality of portions corresponding to the plurality of authentication factors and wherein each step of encrypting a code for an input screen additionally comprises encrypting a different portion of the first encryption key.

Splitting the encryption key into different portions that are encrypted differently (i.e. with different user credentials) may increase the security of the encryption key.

The memory may be divided into a plurality of portions for use by different users, and the method may comprising: repeating at least steps a) to h) for each portion of the memory, such that a different encryption key is generated for, and encrypted for, each portion of the memory.

This may allow different users to securely use the memory. Different users may have access to their memory portion (which may be a logical partition in the memory) but not access to others'. Further, protecting different memory portions (partitions) with different encryption keys ensures that even if an attacker gains access to one memory portion and its associated key, this does not also give the attacker the ability to decrypt data from other memory portions.

The plurality of input screens may comprise a plurality of input screens selected from: a keypad for receiving a code, and at least two different swipe pattern grids for receiving a swipe pattern.

Different users may have different preferences for how to input codes into the controller. Some may find it easier to remember a numerical code while others may prefer a pattern. The swipe pattern grids may have different sizes, e.g. a 3×3 grid, 4×4 grid, 3×5 grid etc.

The method may comprise configuring the controller to require a biometric input or token as a further factor of authentication, wherein authentication via the biometric input or token is required for access to the first encryption key.

Requiring a further factor of authentication that is not "something a user knows" can increase the security of the memory. For example, a biometric input goes with the user and cannot, for example, be left written down somewhere. A token that is in the user's possession must be physically taken from a user before a malicious user can use it, rather than a piece of information the user knows (e.g. PIN or swipe pattern) which can be readily copied.

The first encryption key may comprise an encryption key for encrypting data stored on the first portion of the memory combined with a public memory partition encryption key for encrypting data stored on a public memory partition of the memory. If present, each further encryption key for a portion of the memory may also be combined with the public memory partition encryption key.

In a second aspect, there is provided a method of authenticating a user using a controller that has been configured according to the method of the first aspect, the method comprising the steps:
i) entering first user credentials to the first input screen displayed on the display as a first authentication factor;
j) determining, by the controller, whether the first user credentials match stored first user credentials and, if not, disallowing access to the memory, and if so:
k) decrypting, by the controller, the code associated with the second input screen; and
l) on the basis of the decrypted code, displaying the second input screen on the display;
m) entering second user credentials to the second input screen as a second authentication factor;
n) determining, by the controller, whether the second user credentials match stored second user credentials.

This method offers improved security for the user by protecting the memory with multiple layers. Further, each input screen after the first is only accessible (i.e. is only decrypted) once the user has input correct user credentials in an earlier screen. Thus, any attacker must figure out the user credentials sequentially, and cannot attack all layers in parallel.

The method of the second aspect may have more than two authentication factors including at least one further authentication factor with a corresponding further input screen and further user credentials. In this case, the controller is configured to require each of the first, second and further user credentials before allowing a user access to at least a portion of the memory, the method comprising, for each further authentication factor: if the second user credentials match stored second user credentials decrypting, by the controller, the code associated with the further input screen; displaying the further input screen; entering further user credentials for the further input screen; determining, by the controller whether the further user credentials match the respective stored further user credentials; and if so, optionally repeating these steps for one or more still further factor(s) of authentication, if present, with each subsequent input screen being accessed by decrypting the associated code if the preceding user credentials match respective stored user credentials.

Further layers of input screens may improve the security of the memory. As above, an attacker does not even know the form of a later input screen (e.g. whether it is a keypad or any particular size of swipe pattern grid) until correct credentials have been input for an earlier input screen, and therefore this limits an attackers ability to attack all layers of security in parallel and instead forces sequential attacks. Other things staying equal, sequential attacks by an attacker will take longer to access the memory than parallel attacks.

If the controller has determined that all user credentials match the respective stored user credentials, such that all factors of authentication have been satisfied, then the method according to the second aspect may comprise decrypting, by the controller, the first encryption key and allowing the user access to at least a portion of the memory having data encrypted by the first encryption key.

Keeping the encryption key itself encrypted improves the security by ensuring that an attacker cannot simply bypass the need to input user credentials (e.g. by attaching the memory to a new controller).

The plurality of factors of authentication may include a requirement for a biometric input or for the presence of a token, the method may then comprise the step of detecting a biometric input from a user or detecting the presence of a token; and wherein if the controller has determined that all user credentials match the respected stored user credentials, and also that the biometric input or token identifies an authorised user, such that all factors of authentication have been satisfied, then the method comprises decrypting, by the controller, the first encryption key and allowing the user access to at least a portion of the memory having data encrypted by the first encryption key.

Additional factors of authentication can improve the security of the memory by requiring further things from the user that may not be readily available to an attacker.

According to another aspect, there is provided a portable memory storage device comprising a controller, a memory, and a display configured to receive input from a user, the portable memory storage device configured according to the method of the first aspect.

The memory may be divided into a plurality of portions, wherein each portion is associated with a respective user, wherein each portion is configured according to the method of the first aspect, such that a different encryption key is generated for each portion.

This may allow multiple users to use the same portable memory storage device such that each user's data is protected by a unique encryption key. If an attacker gains access to one portion (partition) of the memory and its associated encryption key, other portions are still safe by virtue of their unique encryption keys.

The memory may further comprise a public memory partition, wherein the controller is configured to combine the encryption key for each portion with a public memory partition encryption key for encrypting and decrypting data on the public memory partition.

The portable memory storage device may comprise a biometric input device and/or a token detecting device. These may provide further security for the memory by requiring the presence of a token owned by the user or the presence of the user to supply a biometric input.

The controller may be configured to authenticate a user by the method of the second aspect.

Certain embodiments of the present disclosure will now be described in greater detail, by way of example only and with reference to the accompanying drawings in which.

Figure 4:
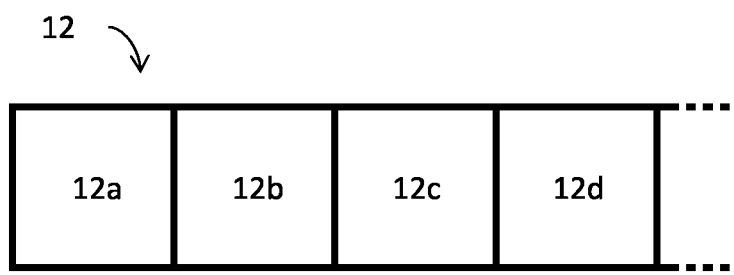
Figure 5:
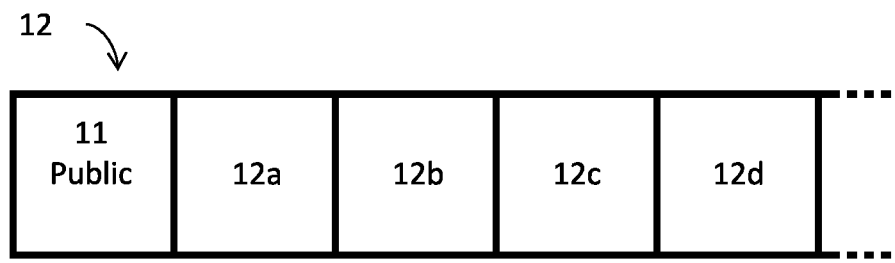
Figure 6:
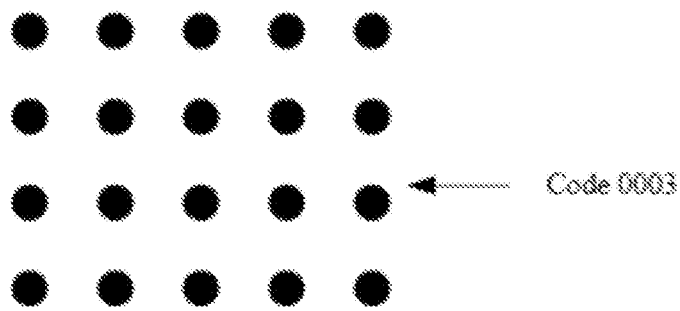
Figure 7:
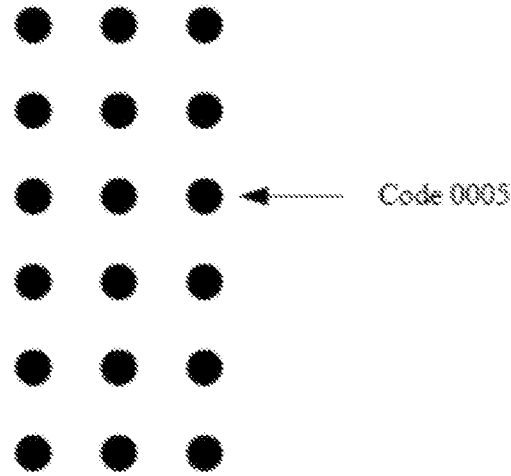
Figure 8:
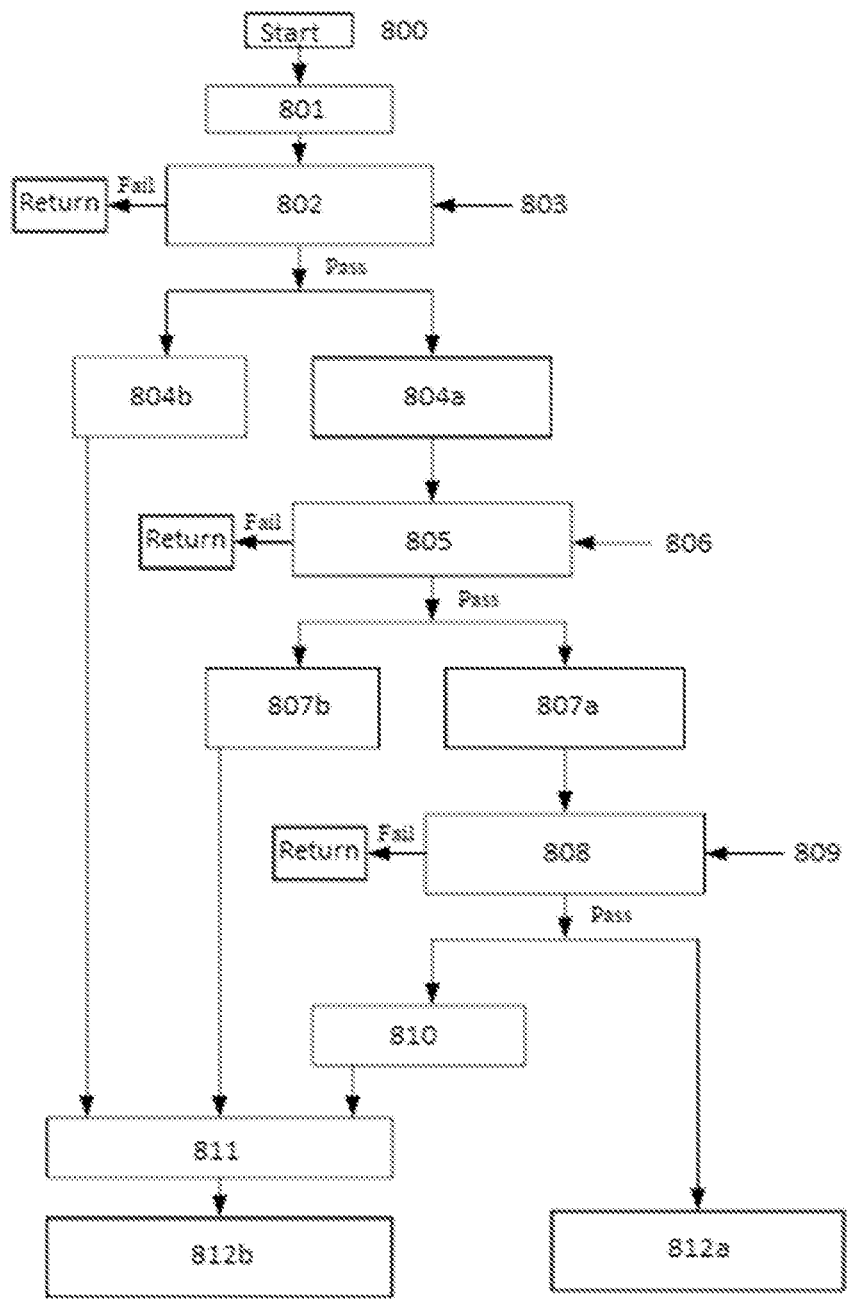
Figure 9:
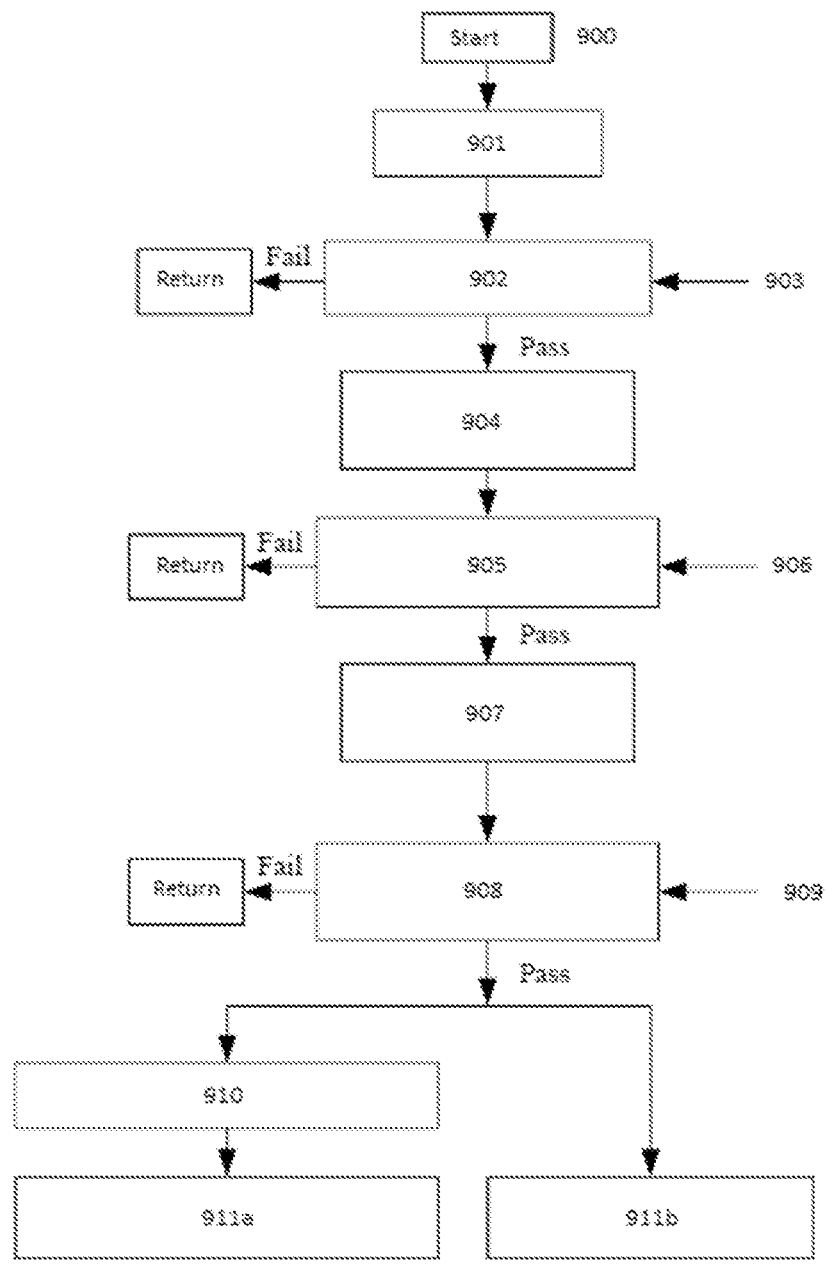

FIG. 4 schematically shows the memory of the portable memory storage device divided into partitions;

FIG. 5 schematically shows the memory of the portable memory storage device divided into partitions with a public memory space;

FIGS. 6 and 7 show example swipe pattern grids, each grid designated by a unique code;

FIG. 8 shows a flow chart of one method of authenticating a user of the portable memory storage device; and FIG. 9 shows a flow chart of another method of authenticating a user of the portable memory storage device.

Figure 1:
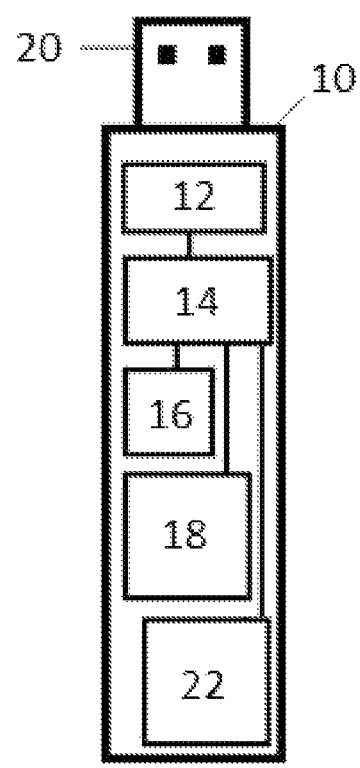
FIG. 1 shows a portable memory storage device having a controller, a memory, and a display.

FIG. 1 shows a portable memory storage device 10. The portable memory storage device 10 of FIG. 1 comprises a memory 12, a controller 14, a biometric input device 16, a display 18, a connector 20, and a token-detecting device 22. The biometric input device 16 and token-detecting device 22 are optional and so may not be present in some portable memory storage devices. The connector 20 is for connecting the portable memory storage device 10 for data transfer with a computer (not shown). For example, the connector 20 may be a direct electrical connection to a host computer such as USB SATA, or PCI-E, or the connector 20 may provide wireless data connection with the computer, such as by NFC, Bluetooth, radio, or Wi-Fi.

The display 18 is connected to the controller 14 and is configured to show a plurality of different input screens to the user for the user to input user credentials. For example, the display 18 may be a touchscreen that is configured to display a plurality of different input screens including a numerical keypad and at least one swipe pattern grid. A swipe pattern grid is an array of dots displayed on the screen. To enter a code into a swipe pattern grid, the user joins up specific dots of the grid by dragging a finger or stylus between the dots in a specific order. Therefore, different users may be presented with, say, a 3×3 swipe pattern grid and each user may set a different swipe pattern on that 3×3 grid where the swipe pattern is information (user credentials) kept secret by the user. Other sizes of swipe pattern grids may be displayed, including non-square grids, such as 3×6 or 5×4 grid patterns shown in FIG. 6.

Figure 2:
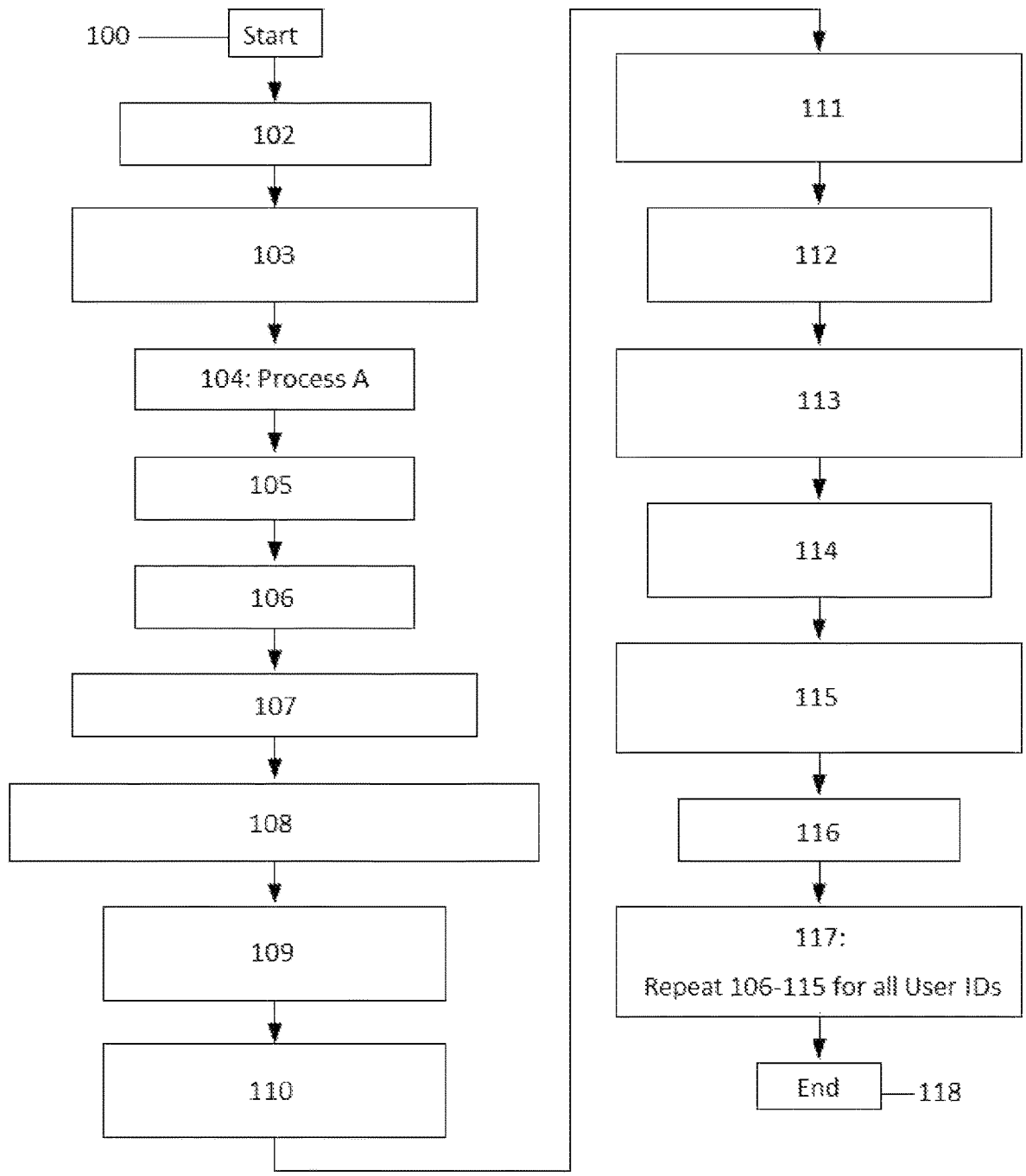
FIG. 2 shows a flow chart of one method of configuring the controller.
Figure 3:
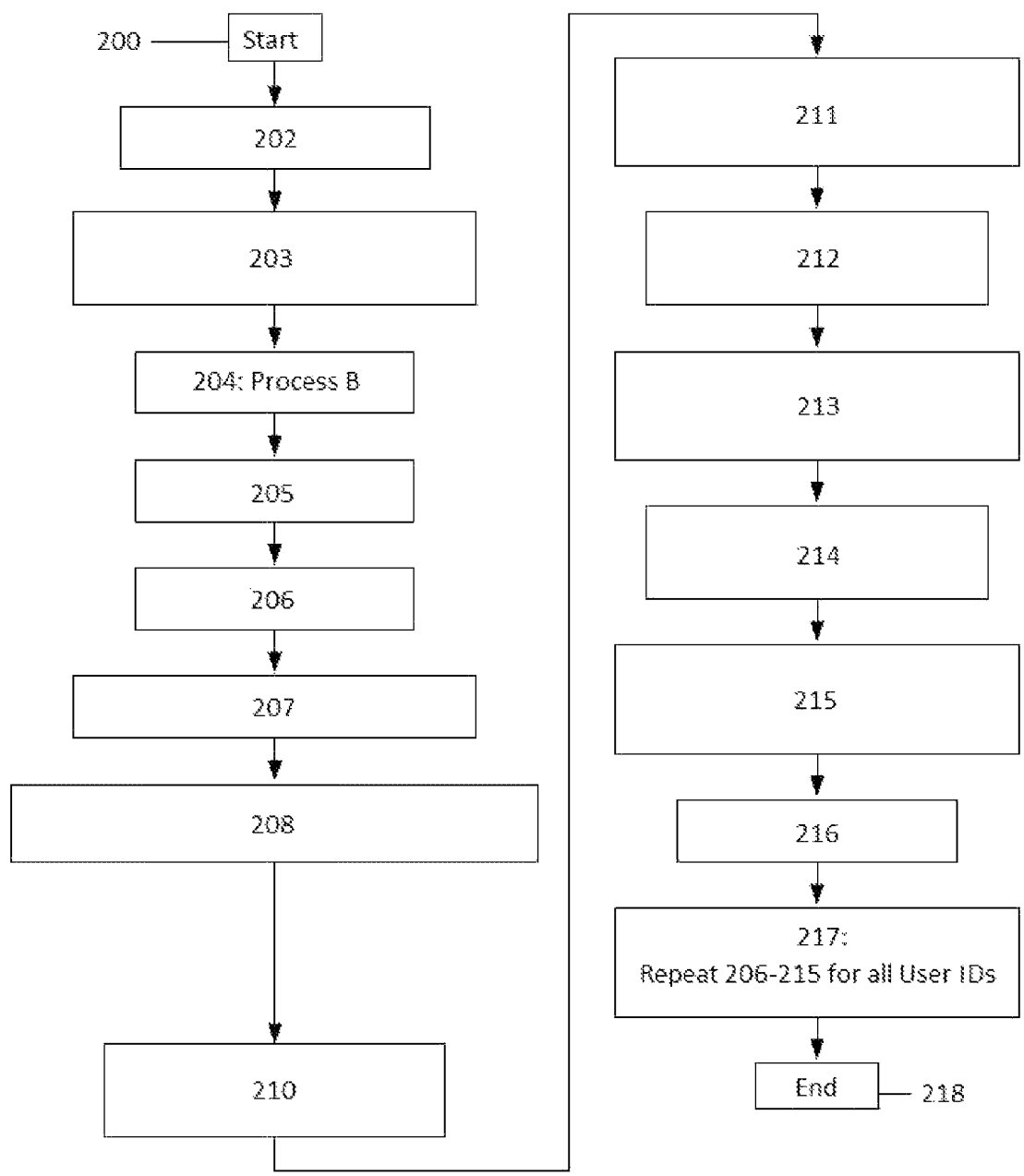
FIG. 3 shows a flow chart of another method of configuring the controller.

FIGS. 2 and 3 show alternative processed for configuring the portable memory storage device 10.

In FIG. 2, a process of configuring the device 10 starts at step 100. At step 102, the user indicates the number, N, of User IDs to set up, e.g. the number of user profiles. This number may also correspond to a number of memory portions, e.g. partitions 12a-d (see FIGS. 4 and 5), set up in the memory 12. With brief reference to FIG. 5, a public memory partition 11 may additionally be set up, where the public memory partition 11 is available for use by all authorized users of the portable memory storage device 10.

At step 103, the memory is partitioned into N portions (or N+1 in the case having a public memory partition) and these are respectively assigned to the user IDs.

At step 104, the user selects Process A. As described in detail below, Process A involves splitting an encryption key into N parts and separately encrypting each part. An alternative configuration process, Process B, is described in detail below with reference to FIG. 3 and is substantially similar to Process A except that the encryption key in Process B is not split into multiple parts.

Following Process A, at step 105, the first of the User IDs is selected for configuration.

At step 106, a first encryption key is randomly generated, by the controller 14, for the first User ID. This encryption key will be used to encrypt/decrypt data stored on the first memory partition (e.g. partition 12a). When repeated for subsequent users (described below), step 106 involves randomly generating a second encryption key for a second User ID for encrypting/decrypting data stored on a second partition (e.g. partition 12b), a third encryption key for a third User ID etc. up to an $N^{th}$ encryption key for the $N^{th}$ User ID. As described in more detail below, in cases when the memory 12 includes a public memory partition 11 (see FIG. 5), another encryption key (e.g. a $0^{th}$ encryption key) will be randomly generated for the public memory partition 11 in step 106. This encryption key for the public memory partition (11) may be combined with the first encryption key for the first memory partition (12a), and may be combined with the second encryption key for the second memory partition (12b) etc. such that, as described below, it is the combined encryption key that is encrypted for each user.

At step 107, the user selects a number, M, of authentication factors where M>1. Each authentication factor corresponds to either a numerical keypad or one of a variety of sizes of swipe pattern grid. The numerical keypad may be designated with code 0001, for example. With brief reference to FIGS. 6 and 7, a 5×4 swipe pattern grid may, for example, be designated with a code 0003, and a 3×6 swipe pattern grid may, for example, be designated with a code 0005. Other sizes of swipe pattern grid may be designated with individual codes, i.e. each swipe pattern grid may have a unique code associated therewith. The code refers to the size/arrangement of the swipe pattern grid that is to be displayed and is independent of any particular pattern (e.g. pattern of joining the dots) that a given user enters as their user credentials for that input screen on the display 18.

This number, M, indicates how many different pieces of (secret) information a user must supply in order to be allowed access to the memory 12 (or to that user's portion of the memory 12). In the example shown in FIG. 2, M=3, and the user will provide first user credentials, then second user credentials, and then third user credentials. In other examples, M=2 or M>3.

The first authentication factor is, for each user, a keypad, i.e. has code 0001. Thus, when the user selects the number of authentication factors at step 107, the user is selecting which second and third input screens that user wants to be presented with to set user credentials (e.g. PINs or swipe patterns). For example, the user may select a 5×4 swipe pattern grid as their second authentication factor and a 3×6 swipe pattern as their third authentication factor.

At step 108, the controller 14 determines the codes associated with the M authentication factors. In the example just described, the codes are: 0001, 0003, and 0005, which correspond to the keypad, the 5×4 swipe pattern, and then the 3×6 swipe pattern (see FIG. 6). A copy of these codes is retained unencrypted for the duration of the setup process and is then discarded/sanitized. As described in more detail below, when the user comes to unlock the memory 12, he/she will first input a numerical code that is a secret known to that user, then he/she will input a secret swipe pattern on the 5×4 swipe pattern grid, and then input a secret swipe pattern on the 3×6 grid. As described below in relation to FIGS. 8 and 9, if the numerical code and specific swipe patterns are all correct, the user will be granted access.

At step 109, the controller 14 divides the encryption key (that was generated at step 106) into M portions or parts. Thus, when M=3, the encryption key will be divided into three portions.

At step 110, the user sets first user credentials for the first authentication factor. In the example portable memory storage device described herein, the first authentication factor is always the numerical keypad (code 0001), and so the first user credentials will be some numerical code. In other examples, the first input screen may be a given one of the swipe pattern grids. All users must be presented with the same first input screen so that all users can enter their first user credentials in the manner allowed by the input screen, i.e. for the first input all users can enter a PIN or all users have set a swipe pattern on a specific size of swipe pattern grid. Subsequent input screens and the total number of input screens may vary between different users.

At step 111, the controller 14 encrypts the first portion of the encryption key using the first user credentials (e.g. the numerical code set at step 110). Further, the controller 14 encrypts the code associated with the second input screen. In the example above, this means that the code 0003 (corresponding to the 5×4 swipe pattern grid) will be encrypted using the first user credentials.

At step 112, the user is presented with an input screen for the second user credentials and the user sets second user credentials. The form of the input screen at this step is determined by the code that was originally selected for the second authentication factor. In the example above, the second code was 0003, corresponding to the 5×4 swipe pattern grid and so, in this case, the user is now shown a 5×4 swipe pattern grid at the input screen and the user enters a specific (i.e. secret) swipe pattern as the second user credentials.

At step 113, the second portion of the encryption key is encrypted using the second user credentials (e.g. the specific swipe pattern set at step 112). Further, the controller 14 encrypts the code associated with the third input screen using the second user credentials. In the example above, this means that the code 0005 (corresponding to the 3×6 swipe pattern grid) will be encrypted using the second user credentials.

At step 114, the user is presented with an input screen for the third user credentials and the user sets third user credentials. The form of the input screen at this step is determined by the code that was originally selected for the third authentication factor. In the example above, the third code was 0005, corresponding to the 3×6 swipe pattern grid and so, in this case, the user is now shown a 3×6 swipe pattern grid at the input screen and the user enters a specific (i.e. secret) swipe pattern on the grid as the third user credentials.

At step 115, the third portion of the encryption key is encrypted with the third user credentials. As there are no further authentication factors required, in this example, there is no code (i.e. for a subsequent input screen) that needs to also be encrypted at this stage.

The encryption key is now encrypted in three different portions. Each portion is encrypted using different user credentials. Further, the aforesaid copy of the codes (e.g. 0001, 0003, 0005) may now be discarded/sanitized by the controller 14. As such, the only remaining record of the second and third codes is in an encrypted form (respectively encrypted along with the first and second encrypted parts of the encryption key).

A mapping table may be stored in the portable memory storage device 10 that maps each code (e.g. 0001, 0003 etc.) to a particular input screen (i.e. the keypad and each swipe pattern grid). The mapping table may either be set up during manufacture of the device 10, or the controller may be configured to generate (random) codes for each input screen during setup of the device (e.g. during Process A or during Process B).

At step 116, the controller selects another User ID, e.g. a second User ID, and, at step 117 the second user repeats steps 106-115. This allows configuration of user credentials and another encryption key for the second user for a second partition (e.g. partition 12b).

For each User ID, M may be a different number, provided M>1. Thus, in one example, the second user may set first, second, third and fourth user credentials, in which case the encryption key is divided into four portions and each portion is encrypted with a respective one of the first to fourth user credentials. Further, the codes for the second, third and fourth input screens may be encrypted along with the first through third portions of the encryption key in the same manner as described previously.

Once all User IDs have been configured (i.e. the steps 106-115 have been repeated for all of the N User IDs chosen at step 102), the process ends at step 118.

At this point, the controller 12 contains a number, N, of User IDs. As described in detail below in relation to FIGS. 8 and 9, when one of the users wishes to access (a portion of) the memory 12, that user enters their first user credentials at the keypad. Based on the input first user credentials, the controller 14 decrypts the code for the second input screen set by that user and causes the display 18 to display the appropriate second input screen to the user and the user then inputs second user credentials etc. Once all the user credentials for a given user have been input, the user is granted access to the memory 12 or at least to the portion of the memory associated with that user, e.g. portion 12a.

Although not depicted in the flow chart of FIG. 2, the process may additionally include (at any step) supplying a biometric user credential (e.g. fingerprint or iris scan) or may include supplying a token owned by the user, as additional factors of authorization. The controller 14 will record this input and require it again when unlocking (a portion of) the memory 12 at a later time. These additional factors of authorization are not used for encrypting any portions of the encryption key.

In cases where there is a public memory partition 11 (see FIG. 5) in the memory 12, an encryption key will be generated for the public memory partition 11. After setting up all User IDs for the portable memory storage device 10, the public memory partition encryption key is encrypted with each user's credentials. That is, the (single) encryption key for the public memory partition 11 may be combined with the encryption key for a given user's memory partition (and this process is repeated for each user) and, for each user, it is this combined key that is encrypted using either the process described above (Process A) or below (Process B). The combination of encryption keys may be a simple concatenation of the two keys or it may be a more complex process of combining the keys. For example, if the encryption key for the first memory partition (12a) is 256 bits, and the public memory partition encryption key is 256 bits, then the combined encryption key may be 512 bits long. In Process A, it is the combined encryption key (e.g. the 513 bits key) that may be split into multiple (i.e. M) portions for encryption. After being combined with each user's encryption key, any unencrypted copies of the public memory partition encryption key remaining on the portable memory storage device 10 are then sanitized (i.e. irretrievably deleted). Later on, when any given user gains access to their own memory partition (see description below in relation to FIGS. 8 and 9), the encrypted public memory partition encryption key will also be decrypted and the user will be granted access to the public memory partition 11, in addition to that user gaining access to their own memory partition. That is, the controller 14 will decrypt the encryption keys to the public memory partition and a user's memory partition when a user has entered correct user credentials. The above-described operation of the public memory space applies equally to all embodiments described herein. FIG. 3 depicts an alternative process for configuring the portable memory storage device 10.

In FIG. 3, the process of configuring the dongle starts at step 200. At step 202, the user indicates the number, N, of User IDs to set up, e.g. the number of user profiles. This number may also correspond to the number of memory partitions 12a-d of the memory 12.

At step 203, the memory is partitioned into N portions and these are respectively assigned to the User IDs.

At step 204, the user selects Process B. As described above, Process A involves splitting an encryption key into N parts and separately encrypting each part. In Process B the encryption key is not split into multiple portions.

Following Process B, at step 205, the first of the User IDs is selected for configuration.

At step 206, a first encryption key is randomly generated, by the controller 14, for the first User ID and this will be used for encrypting/decrypting data stored on the first user's portion of the memory 12 (e.g. partition 12a). When repeated for subsequent users (described below), step 106 involves randomly generating a second encryption key for a second User ID for encrypting/decrypting data on the second user's portion (e.g. partition 12b), a third encryption key for a third User ID etc. up to an $N^{th}$ encryption key for the $N^{th}$ User ID. In cases when the memory 12 includes a public memory space 11, another encryption key (e.g. a $0^{th}$ encryption key) will be randomly generated for the public memory partition 11 in step 206.

At step 207, the user selects a number, M, of authentication factors where M>1. Each authentication factor corresponds to either a numerical keypad or one of a variety of sizes of swipe pattern grid. The numerical keypad may be designated with code 0001, for example. Again with brief reference to FIGS. 6 and 7, a 5×4 swipe pattern may be designated with a code 0003, and a 3×6 swipe pattern may be designated with a code 0005. Other sizes of swipe pattern may be designated with individual codes. As before, the code refers to the size/arrangement of the swipe pattern grid that is to be displayed and is independent of any particular pattern (e.g. pattern of joining the dots) that a given user enters as their user credentials for that input screen.

This number, M, indicates how many different pieces of information a user must supply in order to be allowed access to the memory 12 (or to that user's portion of the memory 12, e.g. portion 12a). In the example shown in FIG. 3, M=3, and the user will provide first user credentials, then second user credentials, and then third user credentials. In other examples, M=2 or M>3.

In the example described herein, the first authentication factor is, for each user, a keypad, i.e. has code 0001. As before, provided all users are given the same first input screen, it is unimportant whether this is a keypad or a given swipe pattern grid. Thus, when the user selects the number of authentication factors at step 207, the user is selecting what second and third input screens that user wants to be presented with to set user credentials (e.g. passwords or swipe patterns). For example, the user may select a 3×6 swipe pattern (code 0005) grid as their second authentication factor and a keypad as their third authentication factor.

At step 208, the controller determines the codes associated with the M authentication factors. In the example just described, the codes are: 0001, 0005, and 0001, which correspond to: the keypad, the 3×6 swipe pattern, and then the keypad again. A copy of these codes is retained unencrypted for the duration of the setup process and is then discarded/sanitized. As described below, when the user comes to unlock the memory 12, he/she will first input a numerical code that is a secret known to that user, then he/she will input a secret swipe pattern on the 3×6 swipe pattern grid, and then input a second code into a keypad. If the numerical codes and specific swipe pattern are all correct, the user will be granted access.

Process B differs from Process A primarily in that the encryption key is not split into parts that are separately encrypted. Therefore, there is no "step 209" in Process B that would broadly correspond to step 109 in Process A and shown in FIG. 2 and Process B moves from step 208 directly to step 210.

At step 210, the user sets first user credentials for the first authentication factor. As the first authentication factor is always the numerical keypad, the user credentials will be some numerical code, i.e. PIN.

At step 211, the controller 14 encrypts the code associated with the second input screen. In the example above, this means that the code 0005 (corresponding to the 3×6 swipe pattern grid) will be encrypted using the first user credentials.

At step 212, the user is presented with an input screen for the second user credentials and the user sets second user credentials. The form of the input screen at this step is determined by the code that was originally selected for the second authentication factor. In the example above, the second code was 0005, corresponding to the 3×6 swipe pattern grid and so, in this case, the user is now shown a 3×6 swipe pattern grid at the input screen and the user enters a specific (i.e. secret) swipe pattern as the second user credentials.

At step 213, the controller 14 encrypts the code associated with the third input screen using the second user credentials. In the example above, this means that the code 0001 (corresponding to the keypad) will be encrypted using the second user credentials.

At step 214, the user is presented with an input screen for the third user credentials and the user sets third user credentials. The form of the input screen at this step is determined by the code that was originally selected for the third authentication factor. In the example above, the third code was 0001, corresponding to the keypad and so, in this case, the user is now shown a keypad at the input screen and the user enters a specific (i.e. secret) numerical code as the third user credentials.

At step 215, the encryption key is encrypted with the third user credentials. As there are no further authentication factors required, in this example, there is no code that is also encrypted at this stage.

The encryption key is now encrypted using the third user credentials. The aforesaid copy of the codes (e.g. 0001, 0005, 0001) may now be discarded by the controller 14. As such, the only remaining record of the second and third codes is in an encrypted form.

At step 216, the controller selects another User ID, e.g. a second User ID, and, at step 217 the second user repeats steps 206-215. This allows configuration of user credentials and another encryption key for the second user.

For each User ID, M may be a different number, provided M>1. Thus, in one example, the second user may set first, second, third and fourth user credentials, in which case the codes for the second, third and fourth input screens may be encrypted using the first, second, and third user credentials, while the encryption key is encrypted with the fourth user credentials. In general, in Process B, when there are N user credentials required, the encryption key is encrypted with the $N^{th}$ user credentials.

Once all User IDs have been configured (i.e. the steps 206-215 have been repeated for all of the N User IDs chosen at step 202), the process ends at step 218.

Although not depicted in the flow chart of FIG. 3, the process may include (at any step) supplying a biometric user credential (e.g. fingerprint or iris scan) or may include supplying a token owned by the user, as additional factors of authorization. The controller 14 will record this input and require it when unlocking (a portion of) the memory 12 at a later time. On the same portable memory storage device 10, one user may configure the controller to require a biometric input or a token for their User ID while another user does not configure the controller to require a biometric input or token.

FIG. 8 depicts a process of gaining access to (a portion of) the memory 12 of a portable memory storage device that has been configured according to Process A, described above in relation to FIG. 2. As with the example described in conjunction with FIG. 2, the user going through the process shown in FIG. 8 has set M=3, i.e. has to input three user credentials to gain access. In other examples, M may be any number greater than 1 and substantially the same process for gaining access to (a portion of) the memory 12 will apply.

The process starts at step 800.

At step 801, the user selects their User ID. In an alternative (not shown), the controller 14 may be configured to skip step 801 and to infer which user is attempting access to the memory 12 by checking the PIN entered on the first input screen.

At step 802, the display 18 displays the first input screen, e.g. the keypad (code 0001).

The user enters their first user credentials at step 803.

If the user credentials are incorrect, the method ends and returns to the start 800.

If the user credentials are correct then, at step 804a the code for the second input screen is decrypted using the first user credentials. Simultaneously, at step 804b, the first part of the encryption key is decrypted using the first user credentials, which are then sanitized, and the decrypted first part of the encryption key is passed to the combining step 811.

Following step 804a, at step 805, the second input screen is displayed at the display 18, based on the code that was decrypted at step 804a (i.e. the second input screen for that user that was selected during the setup process for that user in the process of FIG. 2).

The user enters their second user credentials at step 806.

If the user credentials are incorrect, the method ends and returns to the start 800.

If the user credentials are correct then, at step 807a, the code for the third input screen is decrypted using the second user credentials. Simultaneously, at step 807b, the second part of the encryption key is decrypted using the second user credentials, which are then sanitized, and the decrypted second part of the encryption key is passed to the combining step 811.

Following step 807a, at step 808, the third input screen is displayed at the display 18, based on the code that was decrypted at step 807a.

The user enters their third user credentials at step 809.

If the user credentials are incorrect, the method ends and returns to the start 800.

If the user credentials are correct then, at step 810, the third and final part of the encryption key is decrypted using the third user credentials, which are then sanitized, and the decrypted third part of the encryption key is passed to the combining step 811. The three decrypted parts of the encryption key are combined into the full encryption key at combining step 811 and, at step 812b, the user is provided with (i.e. gains use of) the encryption key for the portion of the memory 12 associated with that User ID (i.e. the User ID entered at step 801). Further, at step 812a, the user is granted access to that partition of the memory 12, i.e. read/write access or read-only access as appropriate.

Data stored on that partition of the memory 12 is encrypted/decrypted using this encryption key.

In the process discussed above, the term "encryption key" may encompass solely a user's encryption key for that user's memory partition. Alternatively, in cases with a public memory partition 11, the term "encryption key" may encompass a combined encryption key composed of the user's encryption key and the encryption key for the public memory partition 11.

Although not shown in FIG. 8, the process of gaining access to (a portion of) the memory 12, can comprise a step of providing a biometric input, such as a fingerprint or iris scan at the biometric input device 16 or providing a token to the token-detecting device 22. This may even be before the first input screen is displayed. Any biometric input or token is not used for decrypting the encryption key.

In cases having a public memory partition 11, the user will also be granted access (i.e. read/write access, or read-only access) to the public memory partition 11 at step 812a.

FIG. 9 depicts a process of gaining access to (a portion of) the memory 12 of a portable memory storage device that has been configured according to Process B, described above in relation to FIG. 3. As with the example described in conjunction with FIG. 3, the user going through the process shown in FIG. 9 has set M=3, i.e. has to input three user credentials to gain access. In other examples, M may be any number greater than 1 and substantially the same process for gaining access to (a portion of) the memory 12 will apply.

The process starts at step 900.

At step 901, the user selects their User ID. In an alternative (not shown), the controller 14 may be configured to skip step 901 and instead to infer which user is attempting access to the memory 12 by checking the PIN entered on the first input screen.

At step 902, the display 18 displays the first input screen (e.g. keypad) to the user.

At step 903, the user enters their first user credentials.

If the first user credentials are incorrect, the method ends and returns to the start 800.

If the first user credentials are correct, the code for the second input screen (for that user, i.e. as selected during the setup process for that user in the process shown in FIG. 3) is decrypted using the first user credentials at step 904.

At step 905, the second input screen is displayed at the display 18, based on the code decrypted at step 904.

The user enters their second user credentials at step 906.

If the second user credentials are incorrect, the method ends and returns to the start 800.

If the second user credentials are correct, the code for the third input screen is decrypted using the second user credentials at step 907.

At step 908, the third input screen is displayed at the display 18, based on the code decrypted at step 907.

The user enters their third and final user credentials at step 909.

If the third user credentials are incorrect, the method ends and returns to the start 900.

If the third user credentials are correct, the encryption key is decrypted at step 910 using the third user credentials.

At step 911a, the user gains access to (i.e. gains use of) the decrypted encryption key, and at step 911b, the user is granted access to (a portion of) the memory 12, i.e. read/write access or read-only access as appropriate, corresponding to that User ID.

Data on that portion of the memory 12 is encrypted/decrypted using this same encryption key.

In cases having a public memory partition 11, the encryption key for the public memory partition will be decrypted in step 910 as well (i.e. in addition to the decryption of the encryption key for that user's memory partition). The user will also be granted access to the encryption key for the public memory space at step 911*a* and also gain access to the public memory partition 11 at step 911*b*.

Although not shown in FIG. 9, the process of gaining access to (a portion of) the memory 12, can comprise a step of providing a biometric input, such as a fingerprint or iris scan at the biometric input device 16 or providing a token to the token-detecting device 22. This may even be before the first input screen is displayed.

The invention claimed is:

1. A method of configuring a controller for controlling access to a memory, the controller connected to a display configured to selectively display a plurality of different input screens, wherein each input screen has a unique code associated therewith, the input screens for receiving user credentials from a user;
   the method comprising the steps of:
   a) inputting to the controller a plurality of authentication factors required to access at least a first portion of the memory;
   b) generating, by the controller, a first encryption key for encrypting data stored on the first portion of the memory;
   c) displaying a first input screen at the display;
   d) entering first user credentials to the first input screen and storing the first user credentials as a first factor of authentication;
   e) displaying a second input screen at the display;
   f) entering second user credentials to the second input screen and storing the user credentials as a second factor of authentication;
   g) encrypting the code for the second input screen using the first user credentials; and
   h) encrypting the first encryption key using at least one of the user credentials.

2. The method according to claim 1, wherein the plurality of authentication factors comprises more than two authentication factors; and
   wherein, before the step h) of encrypting the first encryption key, for each further authentication factor the method comprises:
   displaying a further input screen at the display;
   entering further user credentials to the further input screen and storing the user credentials in the controller as further factor of authentication; and
   encrypting the code for the preceding input screen using the further user credentials.

3. The method according to claim 1, wherein the first encryption key is divided into a plurality of portions corresponding to the plurality of authentication factors and wherein each step of encrypting a code for an input screen additionally comprises encrypting a different portion of the first encryption key.

4. The method according to claim 1, wherein the memory is divided into a plurality of portions for use by different users, the method comprising:
   repeating at least steps a) to h) for each portion of the memory, such that a different encryption key is generated for, and encrypted for, each portion of the memory.

5. The method according to claim 1, wherein the plurality of input screens comprise a plurality of input screens selected from: a keypad for receiving a code, and at least two different swipe pattern grids for receiving a swipe pattern.

6. The method according to claim 1, further comprising configuring the controller to require a biometric input or token as a further factor of authentication, wherein authentication via the biometric input or token is required for access to the first encryption key.

7. The method according to claim 1, wherein the first encryption key comprises an encryption key for encrypting data stored on the first portion of the memory combined with a public memory partition encryption key for encrypting data stored on a public memory partition of the memory, and wherein, if present, each further encryption key for a portion of the memory is combined with the public memory partition encryption key.

8. A method of authenticating a user using a controller that has been configured according to the method of claim 1, the method comprising the steps:
   i) entering first user credentials to the first input screen displayed on the display as a first authentication factor,
   j) determining, by the controller, whether the first user credentials match stored first user credentials and, if not, disallowing access to the memory, and if so:
   k) decrypting, by the controller, the code associated with the second input screen; and
   l) on the basis of the decrypted code, displaying the second input screen on the display;
   m) entering second user credentials to the second input screen as a second authentication factor;
   n) determining, by the controller, whether the second user credentials match stored second user credentials.

9. The method of authenticating a user according to claim 8, wherein there are more than two authentication factors including at least one further authentication factor with a corresponding further input screen and further user credentials, wherein the controller is configured to require each of the first, second and further user credentials before allowing a user access to at least a portion of the memory, the method comprising, for each further authentication factor:
   if the second user credentials match stored second user credentials decrypting, by the controller, the code associated with the further input screen;
   displaying the further input screen;
   entering further user credentials for the further input screen;
   determining, by the controller whether the further user credentials match the respective stored further user credentials; and
   if so, optionally repeating these steps for one or more still further factor(s) of authentication, if present, with each subsequent input screen being accessed by decrypting the associated code if the preceding user credentials match respective stored user credentials.

10. The method of authenticating a user according to claim 8, wherein:
    if the controller has determined that all user credentials match the respective stored user credentials, such that all factors of authentication have been satisfied, then the method further comprises decrypting, by the controller, the first encryption key and allowing the user access to at least a portion of the memory having data encrypted by the first encryption key.

11. The method of authenticating a user according to claim 8, wherein the plurality of factors of authentication include a requirement for a biometric input or for the presence of a token, the method further comprising the step of detecting a biometric input from a user or detecting the presence of a token; and wherein if the controller has determined that all user credentials match the respected stored user credentials, and also that the biometric input or token identifies an authorised user, such that all factors of authentication have been satisfied, then the method comprises decrypting, by the controller, the first encryption key and allowing the user access to at least a portion of the memory having data encrypted by the first encryption key.

12. A portable memory storage device comprising a controller, a memory, and a display configured to receive input from a user, the portable memory storage device configured according to the method of claim 1.

13. The portable memory storage device according to claim 12, wherein the memory is divided into a plurality of portions, wherein each portion is associated with a respective user, wherein each portion is configured such that a different encryption key is generated for each portion.

14. The portable memory storage device according to claim 13, wherein the memory further comprises a public memory partition, wherein the controller is configured to combine the encryption key for each portion with a public memory partition encryption key for encrypting and decrypting data on the public memory partition.

15. The portable memory storage device according to claim 12, comprising a biometric input device and/or a token detecting device.

16. The portable memory storage device according to claim 12, wherein the controller is configured to authenticate a user.

* * * * *